United States Patent

[11] 3,570,381

[72] Inventors Arata Satoo;
Yasuo Uchida, Tokyo, Japan
[21] Appl. No. 739,739
[22] Filed June 25, 1968
[45] Patented Mar. 16, 1971
[73] Assignee Konishiroku Photo Industry Co., Ltd.
[32] Priority July 3, 1967, July 4, 1967, May 30, 1968
[33] Japan
[31] 42/57372, 42/57685 and 43/36356

[54] PROGRAMMED ELECTRONIC SHUTTER
3 Claims, 6 Drawing Figs.
[52] U.S. Cl. .................................................. 95/10, 95/63
[51] Int. Cl. ................................................ G03b 7/08, G03b 9/08
[50] Field of Search .......................................... 95/10 (C), 53, 63, 64, 64 (A)

[56] References Cited
UNITED STATES PATENTS
3,292,516 12/1966 Sato et al. .................. 95/10(C)
3,348,460 10/1967 Schmitt ..................... 95/10(C)
3,362,309 1/1968 Cooper, Jr. et al. ......... 95/10(C)
3,433,144 3/1969 Ivester ...................... 95/10(C)

Primary Examiner—Samuel S. Matthews
Assistant Examiner—Joseph F. Peters, Jr.
Attorneys—Harry C. Bierman, Jordan B. Bierman and Bierman and Bierman ABSTRACT: A control circuit and apparatus for automatically controlling the exposure time and aperture opening of a camera is provided in which a photovoltaic cell is mounted on a camera and connected to a transistor controlled triggering circuit for effecting shutter closure automatically in response to a predetermined amount of light incident on the photovoltaic cell. To automatically control the aperture opening a diaphragm is provided in front of the photovoltaic cell and is linked to the lens diaphragm. Both diaphragms are opened at a predetermined rate upon actuation of the shutter release to provide a continuously varying lens opening, the proper aperture opening being automatically determined by the automatic closure of the shutter by the triggering circuit.

ARATA SATOO
YASUO UCHIDA
INVENTORS

PROGRAMMED ELECTRONIC SHUTTER

The invention relates to a programmed electronic shutter for photographic camera having a time control circuit which is responsive to reflexive light from an object to be photographed for producing a signal to close the shutter blades of the camera after a time interval corresponding to correct exposure.

Usually an electrical or electronic shutter incorporates a time constant circuit comprising a photoconductor and a capacitor for the purpose of controlling the exposure time. However, a photoconductor such as cadmium sulfide has a very slow response speed to light under lower levels of brightness, so that it cannot properly follow rapid variation of light as occurring in a flashlight photograph to prevent a time lag in closing the shutter blades. This results in overexposure.

In order to prevent such disadvantage, the present applicant has proposed a time control circuit incorporating a photovoltaic cell which is claimed in our pending U.S. Pat. application Ser. No. 699,891, filed Jan. 23, 1968, the cell being activated by reflexive light from an object to the photographed when taking pictures by flashlight. Because of high response speed of such cell to light, the proposed circuit enables the same manner of operation in flashlight as in natural light. Thus the photovoltaic cell is connected across the base and emitter of a transistor connected in a grounded-base configuration. The transistor provides a base-collector current which is substantially proportional to the emitter-base current or the output current of the cell. A DC source is connected in the collector circuit in series with a capacitor, which is charged by the base-collector current to a predetermined voltage, whereupon the voltage across the capacitor triggers an electromagnet to close the shutter blades.

The present invention relates to an improvement of the electrical or electronic shutter as described in said pending patent application in that a diaphragm provided in the lens system and another diaphragm usually covering the photovoltaic cell are caused to move at predetermined rates of aperture opening as the shutter release is actuated. This eliminates the necessity for an operator to choose, before taking pictures, a suitable F-value from consideration of the luminance of the object being photographed in natural light and the distance to the object photographed in flashlight, which choice required a certain degree of skill. The signal for operating the electromagnet to close the shutter blades is produced in dependence upon the intensity of reflexive light, so that the shutter speed is predetermined by such intensity. In other words, under high brightness the shutter is closed at a time when the lens diaphragm has opened to a relatively small aperture, and under low brightness, the shutter is closed after the lens diaphragm has reached a relatively large aperture.

It is an object of the invention to provide a programmed electronic shutter which provides a correct and automatic control not only when taking pictures in steady light but also in a flashlight photograph where light intensity varies rapidly, by ensuring that the time integral of the charging current for the capacitor which is produced by light incident on the photovoltaic cell has, at any instant, a one-to-one correspondence with respect to the light amount passed to a photographic film through the lens system. This is realized by utilizing the high speed response to light and the slope of substantially unity on the logarithmic luminance to logarithmic photocurrent characteristic of a photovoltaic cell. The photovoltaic cell is housed within a shutter casing, and a diaphragm is provided to cover the cell normally and is adapted to be moved, upon the actuation of the shutter release, at a predetermined rate of aperture opening concurrently with the lens diaphragm. The rate at which the both interlocked diaphragms are opened may be designed in a suitable manner. In an example, the diaphragms can be designed to reach their maximum aperture within 15 to 30 milliseconds. If the required exposure is not provided within such period, the diaphragms are kept open at their maximum aperture until correct exposure is reached. A programmed electronic shutter is known in two kinds. In one of these, the shutter includes only a single set of blades which are gradually opened upon release and are closed after correct exposure has been given. Although the invention is equally applicable to such electronic shutter, for the convenience of description, the invention will be particularly described with respect to the other kind in which a programmed electronic shutter has two sets of shutter blades. One of the sets is referred to herein as lens diaphragm, and the other set of blades are opened when the charging lever of the camera is operated and are used to determine the time when the shutter is to be closed. The latter set of blades are referred to herein as shutter blades.

It is another object of the invention to provide a programmed electronic shutter in which the overexposure due to time lag inherent to an electromagnet when deenergized by a time control circuit is avoided with a simple arrangement. Thus the diaphragm disposed before the photovoltaic cell is arranged to give a certain amount of exposure to the cell before the shutter release is actuated, while the lens diaphragm remains completely closed. Alternatively, the diaphragm associated with the cell may be arranged to give a greater exposure aperture in comparison with the lens diaphragm. Then upon actuation of the release, the exposure to the cell is biased with respect to the film so that the time control circuit can produce a signal to deactuate the electromagnet at an earlier point in time so as to compensate for the time lag. Since this time lag is constant for an electromagnet irrespective of the luminance of the object to be photographed, and considering the fact that higher luminance causes greater error in exposure, it is arranged so that the bias to the cell exposure corresponds to the luminance of the object being photographed.

It is a further object of the invention to provide a programmed electronic shutter of the kind mentioned above and having the provision to permit effective use of the full amount of light emitted from a flashbulb, thereby removing undue restriction otherwise imposed in taking pictures at a relatively great distance. The electronic shutter according to the invention depends for its operation on a gradually increasing aperture of the diaphragms, so that if the contacts of the flashbulb are closed in synchronism with the opening operation of the diaphragms, the bulb will fire and burn out before the diaphragms can provide sufficient aperture. To overcome this, the invention proposes to close the contacts of the flashbulb by an interlocking movement of the their associated member with the movement of the lens diaphragm and to adjust the position of the member by linkage with a focus adjusting ring to thereby vary the position in time at which the flashbulb is fired in accordance with the distance to the object being photographed. In this manner, the flashbulb is fired at a small diaphragm aperture for an object at a small distance and is fired at a greater aperture approaching the maximum aperture for an object at a great distance. However, because of precise control of correct exposure by the time control circuit associated with the lens diaphragm and shutter blades, the correspondence between the distance to the object and the diaphragm aperture when the contacts are closed need not be precise.

Above and other objects, features and advantages of the invention will become apparent from the following description of the embodiment thereof shown in the drawings, wherein.

Figure 1:
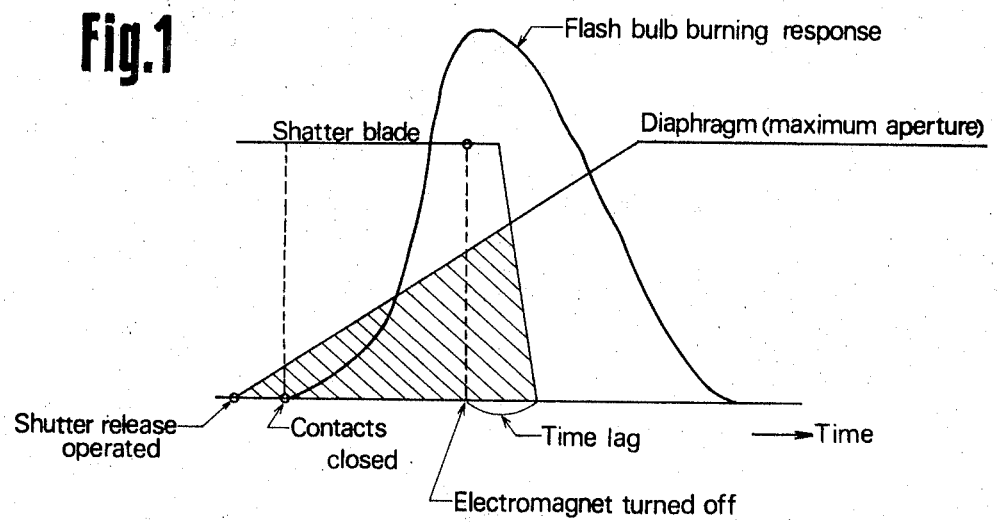
FIG. 1 is a graph illustrating the operation of the programmed electronic shutter according to the invention, the graph showing the variation with time of the shutter and lens diaphragm opening and of the intensity of light from a flashbulb.

Referring to FIG. 1, a shutter operation is shown schematically. Thus the shutter blades are opened when the charging lever of the camera is operated and kept open by a detent. Upon actuation of the release button, an electromagnet is energized and as the release button is further depressed, both diaphragms contained in the lens system and disposed in front of a photovoltaic cell, respectively, begin to open at predetermined rates, e.g. at the same rate of aperture opening. The movement of the diaphragms causes the detent to be disengaged and the electromagnet to keep the shutter blades open. The exposure time is controlled by a time control circuit to be explained later with reference to FIG. 3, and when a correct exposure has been given, the circuit produces a signal to deenergize the electromagnet. Due to inherent time lag of the mechanical operation of the electromagnet, the shutter blades close at an interval after the deenergization of the electromagnet. However, the diaphragms continue to open to reach their maximum aperture as shown in FIG. 1. In FIG. 1, the contacts for a flashbulb is shown to be closed at an interval after the actuation of the shutter release. Such delay will be described later with reference to FIGS. 5 and 6. The flashbulb may provide a burning response as shown, and it will be understood that the amount of exposure given to the film or the photovoltaic cell of the time control circuit is a time integral of the diaphragm aperture multiplied by the intensity of flashlight during the time period from the firing of the flashbulb until the closure of the shutter blades. In FIG. 1, such area of diaphragm aperture is shown hatched. The movement of the diaphragm shown may be achieved by using a spring which urges the diaphragm in its opening direction and which is combined with a simple governor. The diaphragms return to their closed position when the charging lever or film winding shaft is operated. AT this time, it is necessary that the lens diaphragm is first closed before the shutter blades are opened again. Alternatively, for a photographic camera which is provided with a single diaphragm or single set of shutter blades, the diaphragm may be closed by the electromagnet. However, this construction is not advantageous because of a large inertia of both interlocked diaphragms which must then be operated by the electromagnet, with consequent increase in time lag. In any of these cases, the diaphragms are closed before the shutter release is operated again.

Figure 2:
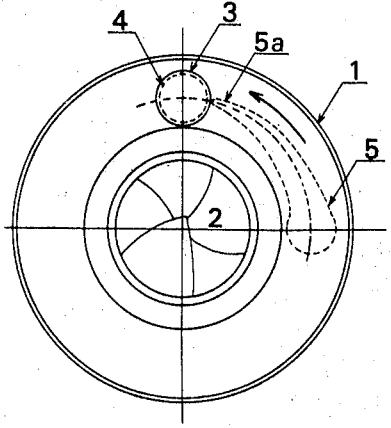
FIG. 2 is a schematic front view of the programmed electronic shutter.

In FIG. 2, there are shown mechanical parts of the programmed electronic shutter schematically. Within a shutter casing 1 is housed a lens diaphragm 2 which is shown in its closed position before the shutter release (not shown) is operated. A condenser lens 3 is arranged in the path of light to a photovoltaic cell 4, and between the lens and the cell is rotatably arranged an annular diaphragm associated with the cell, this diaphragm having a notch 5 of teardrop form formed therein. The arrangement is such that when the shutter release is operated, both diaphragms begin to rotate in the direction indicated by an arrow, and the shape of the teardrop notch 5 is designed to provide a similar change in the aperture of the cell diaphragm as in the aperture of the lens diaphragm 2. Usually it takes several milliseconds for the intensity of light emitted from a flashbulb to reach its maximum value, so that it may be useful to choose a change of aperture of the diaphragms which is not linearly increasing with time, but which maintains a relatively small aperture over a prolonged initial time.

Figure 3:
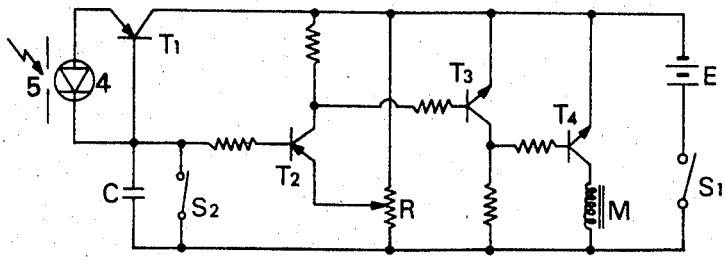
FIG. 3 is a circuit diagram of the programmed electronic shutter.

An example of the time control circuit is shown in FIG. 3. The photovoltaic cell 4 is placed behind its associated diaphragm having aperture or notch 5 and is connected across the emitter and base of a pnp transistor $T_1$. The transistor has its collector connected to the negative terminal of a battery E and its base connected with one plate of an integrating capacitor C, which has its other plate connected with the positive terminal of the battery through a normally open switch $S_1$. The switch $S_1$ is closed when the shutter release is operated. The capacitor is shunted by a normally closed switch $S_2$. The upper plate of the capacitor is connected through a resistor to the base of a pnp transistor $T_2$ which has its collector connected to the negative battery terminal through a resistor and its emitter connected to a movable point on a variable resistor R that is connected across the battery. The resistor R provides adjustment of the voltage at which the transistor $T_2$ is rendered conductive in dependence upon exposure factors such as film speed. The collector of the transistor $T_2$ is further connected through a resistor to the base of an npn transistor $T_3$ which has its emitter connected to the negative battery terminal and its collector connected through a resistor and the switch $S_1$ in series to the positive battery terminal. The collector of the transistor $T_3$ is also connected through a resistor to the base of an npn transistor $T_4$ which has its emitter connected to the negative battery terminal and its collector connected with one end of an electromagnet M, the other end of which is connected to the positive battery terminal through the switch $S_1$.

In operation, upon actuation of the shutter release, the switch $S_1$ is closed and the transistor $T_4$ is forwardly biased into conduction so that the electromagnet M is energized to keep the shutter blades open. The both diaphragms shown in FIG. 2 are caused to begin to open at a preset rate by the operation of the release and at the same time, and the normally closed switch $S_2$ is operated to open. Thus light incident on the photovoltaic cell 4 through the gradually increasing aperture 5 causes a corresponding collector-base current of the transistor $T_1$ to flow through the capacitor C, thereby charging the capacitor. When the capacitor has been charged to a voltage sufficient to trigger the transistor $T_2$ which is determined by the setting of the variable resistor R, the transistor $T_2$ is turned on, thereby providing base current to the transistor $T_3$. As a result, the transistor $T_3$ conducts and removes base current from the transistor $T_4$, which therefore rapidly turns off and the electromagnet is deenergized. Closure of the shutter blades opens the switch $S_1$ and closes the switch $S_2$, which discharges the capacitor.

It is to be noted that the resistance of the emitter-base path of the transistor $T_1$ represents the load of the photovoltaic cell, and because of low resistance of a forwardly biased emitter-base junction, such load is small so that the linearity of the luminance-to-photocurrent characteristic of the cell is well maintained. This fact, combined with a current amplification factor of approximately unity provided by the grounded-base configuration, ensures that the current flow in the collector-base circuit of the transistor $T_1$ closely corresponds to the photocurrent or light input over an extensive range thereof. Furthermore, the grounded-base configuration provides a relatively high output impedance and this ensures good linearity of the collector current against brightness. In other words this prevents the collector current from becoming nonlinear as an increasing voltage is built up across the capacitor. Such nonlinearity cannot be avoided if the photovoltaic cell is connected directly in series with the capacitor.

Figure 4:
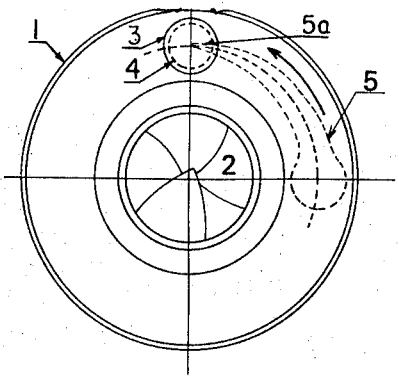
FIG. 4 is a view similar to FIG. 2, but showing means to compensate for the time lag of an electromagnet.

FIG. 4 shows a modification of the arrangement shown in FIG. 2 in that the diaphragm associated with the photovoltaic cell is offset in position so that an end part 5a of the notch 5 extends in front of the cell normally, that is, before the shutter release is operated. In this manner, when the shutter release is operated, the photovoltaic cell is subjected to more exposure than the film, so that the control circuit can produce a signal to deenergize the electromagnet prematurely so as to compensate for the time lag involved with the deactuation of the electromagnet. Although the cell is normally exposed partly by the end part 5a of the notch, this does not cause any adverse effect on the circuit operation, since the capacitor is short-circuited by the switch $S_2$ so that it cannot be charged before the shutter release is operated. Alternatively, the cell diaphragm need provide a nora normally open aperture, but the leading end of the notch 5 may be broadened than usual. In either case, the maximum aperture of the cell diaphragm remains unchanged. Such biased exposure to the cell ensures compensation of the time lag in accordance with the luminance.

Figure 5:
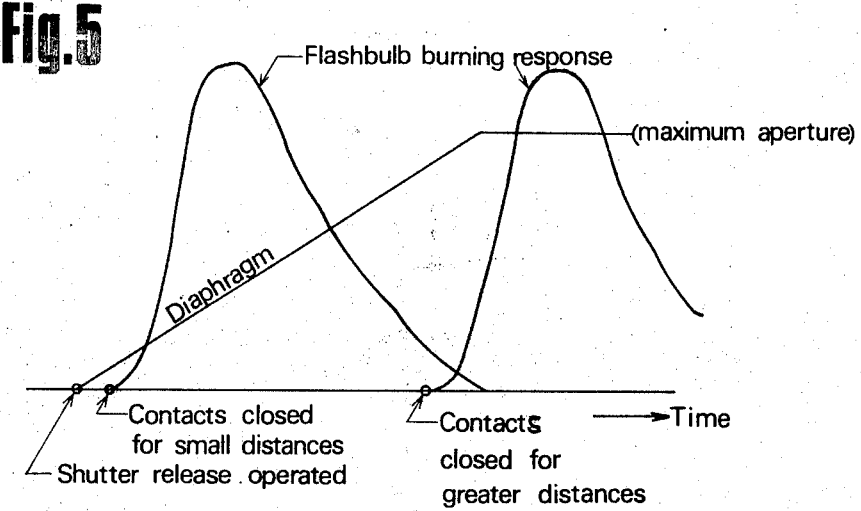
FIG. 5 is a graph schematically illustrating the manner of varying the firing timing of the flashbulb with the movement of a focus adjusting ring; and, FIG. 6 is a schematic view of an example of the mechanism which may be used to achieve the adjustment shown in FIG. 5.
Figure 6:
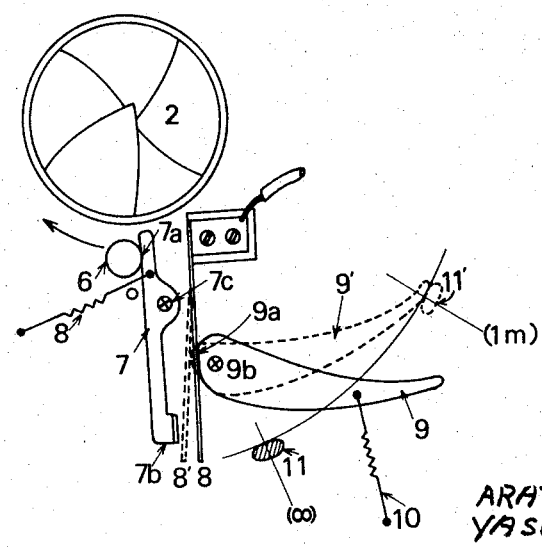

FIG. 5 illustrates that the firing of flashbulbs is changed according to the distance of the object to be photographed. This provides an effective use of light output of the flashbulb, particularly when taking pictures at a relatively great distance. A mechanism for achieving such adjustable firing timing is shown in FIG. 6. In this FIG., parts as are shown in their position before the shutter release is operated, as illustrated by the closed lens diaphragm 2. REference numeral 6 denotes a projection on a ring (not shown) which controls the opening and closing movement of the lens diaphragm 2, and as the latter is opened, the projection 6 moves in the direction indicated by an arrow. A lever 7 of conductive material is pivoted at 7c and its one end 7a is urged against the projection 6 under the action of a tension spring 8 extending between the end 7a and a stop in the camera housing. The other end 7b and a stop in the camera housing. The other end 7b of the lever cooperates with a contact piece 8 which is connected in the circuit of a flashbulb, and as the projection 6 moves clockwise, as viewed in FIG. 6, the end 7b contacts the contact piece 8, thereby completing the flashbulb circuit. An arcuate lever 9 having a cam surface 9a at its one end is pivoted at 9b and is urged to rotate clockwise by a tension spring 10. The lever 9 is made from an insulating material, preferably plastics, and engages the contact piece 8 intermediate at its ends with the cam surface 9a. A link 11 extends from the focus adjusting ring into the shutter casing and is engageable with the lever 9 so as to move the latter counterclockwise against the action of the spring 10 to an extent which depends on the setting of the focus adjusting ring. In the position shown, the link 11 corresponds to the indication of infinity on the focus adjusting ring. AT a distance between infinity and 10 meters, the link 11 is arranged not to engage the lever 9, and hence under such situation, the flashbulb is fired at the time when the diaphragm aperture is approaching its maximum. When the link 11 engages the lever 9, the cam surface 9a causes the contact piece 8 to flex toward the lever 7, for example to a position 8', thereby causing the firing of the flashbulb to occur at a smaller diaphragm aperture. The position 9' of the lever 9 corresponds to the indication of 1 meter or less on the focus adjusting ring and hence the flashbulb is fired at the minimum diaphragm aperture.

It will be appreciated that the adjustment of the contact piece 8 with the movement of the focus adjusting ring is not critical for correct exposure with the programmed electronic shutter according to the invention.

From the foregoing, it will be understood that the invention eliminates the necessity of considering guide members and choosing F-values and still provides a correct exposure in taking pictures with flashlight, thereby greatly facilitating flashlight photographing. Use of reflexive light from an object being photographed as an input to the photovoltaic cell permits various illumination factors such as room factor, reflector efficiency to be automatically reflected in determining correct exposure and as also permits to use an increased number of flashbulbs and bounce illumination. The electronic shutter is directly applicable to taking pictures in natural or steady light without requiring any change. Furthermore, the programmed electronic shutter can be produced without using any particular technique or cumbersome adjustment.

I claim:

1. An electronic shutter including a photovoltaic cell and a triggering circuit having a source of power therein, a lens diaphragm for controlling lens aperture and a diaphragm mounted in front of said photovoltaic cell for automatically controlling the F-stop of said camera, said diaphragm being linked to said lens diaphragm such that when the shutter release of the camera is operated, both said diaphragms are moved in their opening direction at predetermined rates, said photovoltaic cell being connected in parallel with a transistor and a capacitor in said triggering circuit to linearly control the charging current to said capacitor as a function of the incident light and the variable diaphragm opening, triggering means in said circuit responsive to a predetermined level of capacitor charge, a normally conducting electromagnet connected to said triggering circuit for holding the shutter release in open position while the capacitor is charging, said triggering means being operated when said predetermined level of capacitor charge is reached to deenergize the said electromagnet to close said shutter and complete exposure.

2. An electronic shutter according to claim 1, wherein the diaphragm associated with the photovoltaic cell is shaped so as to provide during the initial phase of the opening of the both diaphragms, a greater amount of exposure to the cell than that provided by the lens diaphragm.

3. An electronic shutter according to claim 1, further comprising a pair of contacts making the electrical circuit of a flashbulb, the relative position of said contacts being determined by a member interlocked with the focus adjusting means of the camera, thereby causing the flashbulb to fire early or later depending on the distance to an object being photographed.